US010496994B2

(12) United States Patent
Hopper (10) Patent No.: US 10,496,994 B2
(45) Date of Patent: Dec. 3, 2019

(54) ENHANCED AUTHENTICATION WITH DARK WEB ANALYTICS (71) Applicant: CA, Inc., Islandia, NY (US)

(72) Inventor: Robin Hopper, Prague (CZ)

(73) Assignee: CA, Inc., Islandia, NY (US)

(*) Notice: Subject to any disclaimer, the term of this patent is extended or adjusted under 35 U.S.C. 154(b) by 140 days.

(21) Appl. No.: 15/475,958

(22) Filed: Mar. 31, 2017

(65) Prior Publication Data

US 2018/0288073 A1    Oct. 4, 2018

(51) Int. Cl.
*H04L 29/06* (2006.01)
*G06Q 20/40* (2012.01)

(52) U.S. Cl.
CPC ....... *G06Q 20/4016* (2013.01); *G06Q 20/401* (2013.01); *H04L 63/08* (2013.01); *H04L 63/1425* (2013.01)

(58) Field of Classification Search
CPC . H04L 63/1416; H04L 63/1425; H04L 63/20; G06Q 20/4016
See application file for complete search history.

(56) References Cited

U.S. PATENT DOCUMENTS

| | | | | |
|---|---|---|---|---|
| 8,489,643 B1 * | 7/2013 | Rubanovich | ...... | G06F 17/30899 707/794 |
| 8,739,278 B2 * | 5/2014 | Varghese | ...... | G06F 21/31 726/22 |
| 8,856,894 B1 * | 10/2014 | Dean | ...... | H04L 63/08 713/175 |
| 9,258,321 B2 | 2/2016 | Amsler et al. | | |
| 9,516,035 B1 * | 12/2016 | Moritz | ...... | H04L 63/102 |
| 9,600,651 B1 * | 3/2017 | Ryan | ...... | G06F 21/36 |
| 10,218,697 B2 * | 2/2019 | Cockerill | ...... | H04L 63/0853 |
| 10,250,583 B2 * | 4/2019 | Caldera | ...... | H04L 63/08 |
| 10,268,840 B2 * | 4/2019 | Lockhart, III | ...... | G06F 21/6263 |
| 10,313,385 B2 * | 6/2019 | Shakarian | ...... | H04L 63/1433 |
| 10,326,786 B2 * | 6/2019 | Gladstone | ...... | H04L 63/1433 |
| 10,356,099 B2 * | 7/2019 | Caldera | ...... | H04L 63/10 |
| 2013/0197998 A1 * | 8/2013 | Buhrmann | ...... | G06Q 30/0255 705/14.53 |

(Continued)

FOREIGN PATENT DOCUMENTS

WO    WO-2017115272 A1 *    7/2017    ....... G06F 17/30864

OTHER PUBLICATIONS

Computer Associates, Data Sheet, "CA Strong Authentication," Copyright 2015, available online at https://www.ca.com/content/dam/ca/us/files/data-sheet/ca-strong-authentication.pdf, (2 pages).

(Continued)

*Primary Examiner* — Joseph P Hirl
*Assistant Examiner* — Steven T Gundry
(74) *Attorney, Agent, or Firm* — Alliance IP, LLC (57) ABSTRACT

Objects in a website of a dark web, which is accessible over an anonymous network, are searched for information associated with an entity. A threat level is determined based, at least in part, on, and a transaction initiated in a system associated with the entity is detected. The transaction is determined to be associated with an elevated degree of risk based, at least in part, on the threat level. Modifying an authentication requirement for the transaction is based, at least in part, on the elevated degree of risk.

20 Claims, 5 Drawing Sheets

(56) References Cited

U.S. PATENT DOCUMENTS

| | | | | |
|---|---|---|---|---|
| 2013/0218765 | A1* | 8/2013 | Hammad | G06Q 20/4016 705/41 |
| 2014/0108251 | A1* | 4/2014 | Anderson | G06Q 20/4016 705/44 |
| 2014/0282977 | A1* | 9/2014 | Madhu | G06Q 50/265 726/7 |
| 2015/0163121 | A1* | 6/2015 | Mahaffey | G06F 11/0766 707/687 |
| 2015/0188949 | A1* | 7/2015 | Mahaffey | H04L 63/20 726/1 |
| 2015/0264078 | A1 | 9/2015 | Beauchesne et al. | |
| 2016/0019546 | A1* | 1/2016 | Eisen | G06Q 20/4016 705/44 |
| 2016/0044054 | A1* | 2/2016 | Stiansen | H04L 63/1416 726/24 |
| 2016/0275303 | A1* | 9/2016 | Narayanaswamy | G06F 21/6218 |
| 2017/0063932 | A1* | 3/2017 | Hubbard | H04L 63/20 |
| 2017/0161520 | A1* | 6/2017 | Lockhart, III | H04L 63/08 |
| 2017/0161749 | A1* | 6/2017 | Shaikh | G06Q 20/4016 |
| 2017/0223030 | A1* | 8/2017 | Merza | H04L 63/1416 |
| 2017/0251013 | A1* | 8/2017 | Kirti | H04L 63/1416 |
| 2017/0264640 | A1* | 9/2017 | Narayanaswamy | G06F 17/30864 |
| 2017/0300918 | A1* | 10/2017 | Bernstein | G06Q 20/385 |
| 2017/0331839 | A1* | 11/2017 | Park | H04L 63/1416 |
| 2017/0339178 | A1* | 11/2017 | Mahaffey | H04L 41/142 |
| 2017/0353483 | A1* | 12/2017 | Weith | H04L 63/1433 |
| 2018/0176197 | A1* | 6/2018 | Matthews | H04L 63/0807 |
| 2018/0176206 | A1* | 6/2018 | Matthews | H04L 63/083 |
| 2018/0189359 | A1* | 7/2018 | Jenkins | G06F 15/18 |
| 2018/0247312 | A1* | 8/2018 | Loganathan | G06Q 20/4016 |
| 2018/0270266 | A1* | 9/2018 | Zoldi | G06Q 10/0635 |
| 2018/0288073 | A1* | 10/2018 | Hopper | H04L 63/1425 |
| 2018/0316665 | A1* | 11/2018 | Caldera | H04L 63/104 |
| 2018/0359244 | A1* | 12/2018 | Cockerill | H04L 63/0853 |
| 2019/0035027 | A1* | 1/2019 | Ng | G06Q 40/08 |
| 2019/0066248 | A1* | 2/2019 | McEachern | G06Q 50/265 |
| 2019/0073647 | A1* | 3/2019 | Zoldi | G06Q 20/10 |
| 2019/0102714 | A1* | 4/2019 | Albert | G06Q 10/0635 |
| 2019/0114630 | A1* | 4/2019 | Torkelson | G06Q 20/401 |
| 2019/0122149 | A1* | 4/2019 | Caldera | G06Q 10/0635 |
| 2019/0182216 | A1* | 6/2019 | Gulak | G06Q 20/3829 |
| 2019/0207960 | A1* | 7/2019 | Chu | H04L 63/1416 |
| 2019/0222567 | A1* | 7/2019 | Caldera | H04L 63/083 |
| 2019/0222602 | A1* | 7/2019 | Linder | H04L 63/1433 |

OTHER PUBLICATIONS

Computer Associates, Data Sheet, "CA Risk Analytics," Copyright 2014, available online at https://www.ca.com/content/dam/ca/us/files/data-sheet/ca-risk-analytics.pdf, (2 pages).

Computer Associates, Data Sheet, "CA Risk Authentication," Copyright 2015, available online at https://www.ca.com/content/dam/ca/us/files/data-sheet/ca-risk-authentication.pdf, (2 pages).

Continuum Analytics, "Developer's Guide to Memex Explorer, Revision d2910496," Copyright 2014-15, available online at http://memex-explorer.readthedocs.io/en/latest/dev_guide.html, (5 pages).

Continuum Analytics, "Glossary, Revision d2910496," Copyright 2014-15, available online at http://memex-explorer.readthedocs.io/en/latest/glossary.html, (2 pages).

Continuum Analytics, "Memex Explorer Crawler Guide, Revision d2910496," Copyright 2014-15, available online at http://memex-explorer.readthedocs.io/en/latest/crawler_guide.html, (10 pages).

Continuum Analytics, "Memex Explorer, Revision d2910496," Copyright 2014-15, 2 pages, available online at http://memex-explorer.readthedocs.io/en/latest/index.html, (2 pages).

Continuum Analytics, "User's Guide to Memex Explorer, Revision d2910496," Copyright 2014-15, available online at http://memex-explorer.readthedocs.io/en/latest/user_guide.html, (16 pages).

Continuum Analytics, "Manual Testing Guide, Revision d2910496," copyright 2014-15, available online at http://memex-explorer.readthedocs.io/en/latest/manual_testing_guide.html, (5 pages).

Riehl, Katrina, "Memex: Mining the Dark Web," PyData NYC, Dec. 4, 2015, Youtube video Available online at https://www.youtube.com/watch?v=zDwoaZVFn50, (1 page).

Riehl, Katrina, "Memex: Mining the Deep Web," Continuum Analytics, Nov. 9, 2015, available online at file:///C:/Users/admin/Downloads/pydatanewyork2015-151123150201-Iva1-app6892.pdf, (30 pages).

* cited by examiner

ENHANCED AUTHENTICATION WITH DARK WEB ANALYTICS

BACKGROUND

The present disclosure relates generally to the field of computing system security, and more specifically, to enhanced authentication with dark web analytics.

Network-connected computing systems often require credentials to be provided and authenticated before granting access to computing services and information. For example, an end user of a computing device (e.g., mobile device, desktop, laptop, etc.) may provide user credentials to access an online financial services account or to facilitate an online transaction via the financial services account. User credentials can include, for example, a personal identification number (PIN), a user identifier, a password. Enhanced authentication techniques can provide greater security, but may impact the user experience. For example, multi-factor authentication can require an end user of a computing device to provide two or more authentication factors before gaining access to the services and information. Risk analytics may be employed by financial systems to evaluate transactions based on various risk factors and policies associated with a requested transaction (e.g., online payment, transfer, etc.) to determine whether to require additional authentication, deny the transaction, or allow the transaction.

BRIEF SUMMARY

According to one aspect of the present disclosure, objects in a website of a dark web, which is accessible over an anonymous network, can be searched for information associated with an entity. A threat level based, at least in part, on the information can be determined, and a transaction initiated in a system associated with the entity can be detected. The transaction can be determined to be associated with an elevated degree of risk based, at least in part, on the threat level. Modifying an authentication requirement for the transaction can be based, at least in part, on the elevated degree of risk.

BRIEF DESCRIPTION OF THE DRAWINGS

Like reference numbers and designations in the various drawings indicate like elements.

DETAILED DESCRIPTION

As will be appreciated by one skilled in the art, aspects of the present disclosure may be illustrated and described herein in any number of patentable classes or contexts including any new and useful process, machine, manufacture, or composition of matter, or any new and useful improvement thereof. Accordingly, aspects of the present disclosure may be implemented entirely in hardware, entirely software (including firmware, resident software, micro-code, etc.) or combining software and hardware implementations that may all generally be referred to herein as a "circuit," "module," "component," "logic," "engine," "generator," "agent," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but is not limited to, an electronic, magnetic, optical, electromagnetic, or semiconductor system, apparatus, or device, or any suitable combination of the foregoing. More specific examples (a non-exhaustive list) of the computer readable storage medium includes the following: a portable computer diskette, a hard disk, a random access memory (RAM), a read-only memory (ROM), a programmable read-only memory (PROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, assembly language, or other programming languages. The program code may execute entirely on a local computer (e.g., server, server pool, desktop, laptop, appliance, etc.), partly on the local computer, as a stand-alone software package, partly on the local computer and partly on a remote computer, or entirely on a remote computer. In the latter scenario, the remote computer may be connected to the local computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS). Generally, any combination of one or more local computers and/or one or more remote computers may be utilized for executing the program code.

Aspects of the present disclosure are described herein with reference to flowchart illustrations, interaction diagrams, and/or block diagrams of methods, apparatuses (systems) and computer program products according to embodiments of the disclosure. It will be understood that each block of the flowchart illustrations and/or block diagrams, each interaction of the block diagrams, combinations of blocks in the flowchart illustrations and/or block diagrams, and/or combinations of interactions in the block diagrams can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks and/or functions/acts specified in the interactions of the block diagram block or blocks.

These computer program instructions may also be stored in a computer readable medium that, when executed, can direct a computer, other programmable data processing apparatus, or other devices to function in a particular manner, such that the instructions when stored in the computer readable medium produce an article of manufacture including instructions that, when executed, cause a computer to implement the function/act specified in the flowchart and/or block diagram block or blocks and/or the function/act specified in the interaction or interactions of the block diagrams. The computer program instructions may also be loaded onto a computer, other programmable instruction execution apparatus, or other devices to cause a series of operations to be performed on the computer, other programmable apparatuses or other devices to produce a computer implemented process such that the instructions, which execute on the computer or other programmable apparatus provide processes for implementing the functions/acts specified in the flowchart and/or block diagram block or blocks and/or functions/acts specified in the interaction or interactions of the block diagrams.

Figure 1:
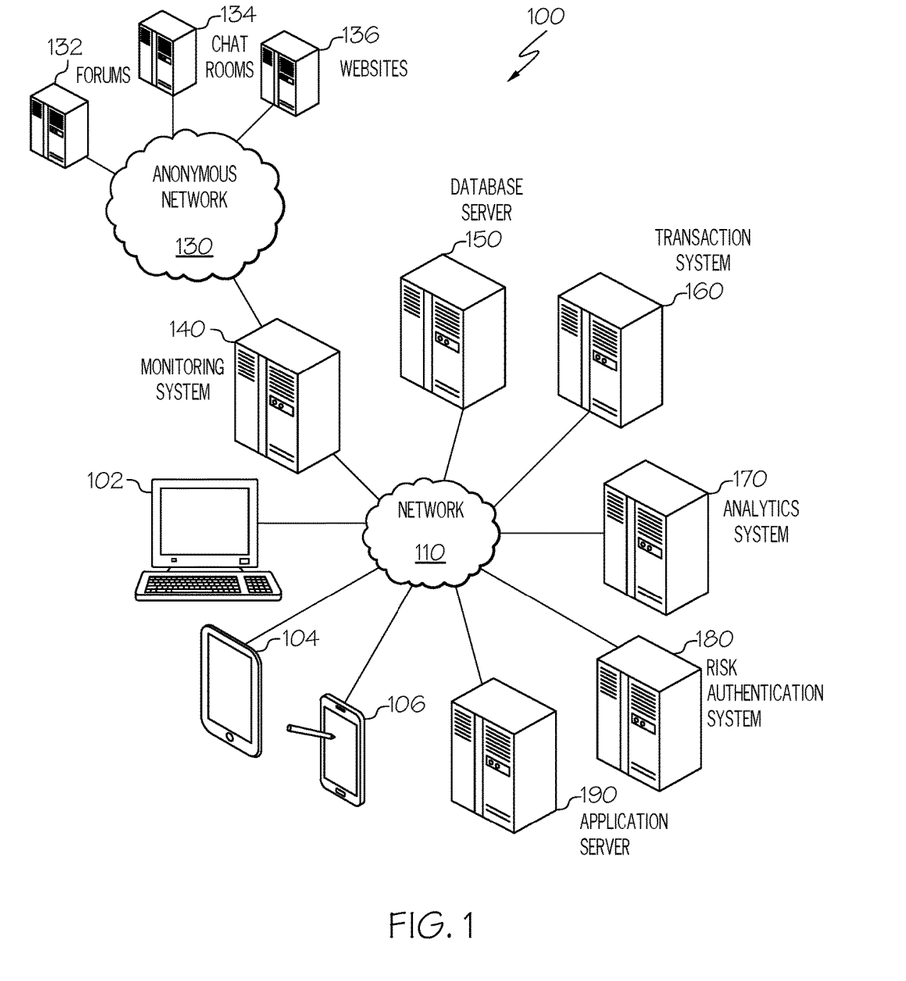
FIG. 1 is a simplified schematic diagram of an example computing environment for enhancing authentication in a transaction system with dark web analytics according to at least one embodiment.

Referring now to FIG. 1, a simplified block diagram is shown illustrating an example computing environment 100 in which authentication can be enhanced in a transaction system based on dark web monitoring and analytics. Computing environment 100 includes a monitoring system 140, a database server 150, a transaction system 160, an analytics system 170, a risk authentication system 180, an application server 190 (e.g., web servers, application servers, database systems, mainframe systems and other examples), client devices such as laptops (e.g., 102), smart phones (e.g., 104), and other mobile devices (e.g., 106), and any other device, component, or element operable to exchange information in a network 110. Monitoring system 140 may be operable to exchange information in network 110 and also in an anonymous network that enables information exchanges in the "dark web," which is intentionally hidden and is inaccessible through standard web browsers. Various application servers may host services and provide other resources through anonymous network 130 in the dark web, including for example, forums 132, chat rooms 134, websites 136, and any other service or resource in which communications and/or information can be exchanged.

With reference to various elements of FIG. 1, a description of the infrastructure of computing environment 100 is now provided. Elements of FIG. 1 may be coupled to one another through one or more interfaces employing any suitable connections (wired or wireless), which provide viable pathways for network communications. Generally, network 110 and anonymous network 130 represent a series of points or nodes of interconnected communication paths for receiving and transmitting packets of information that propagate through computing environment 100. A network, such as networks 110, 130), can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof. Unlike network 110, however, anonymous network 130 is a special anonymizing software network that can be used to access the dark web, which contains websites that are not indexed and are inaccessible through standard web browsers.

The world wide web is a software layer that provides a mechanism for exchanging information over the Internet. The world wide web runs over a system of Internet servers that can support documents formatted in HyperText Markup Language (HTML) and use Hypertext Transfer Protocol (HTTP), which is an application protocol that facilitates data communications of the HTML documents in distributed information systems.

Some statistics indicate that common (e.g., commercial) search engines provide access to only 5-15% of the content available over the Internet. This content, which is accessible by common search engines, is referred to as the surface web. The deep web and dark web make up the rest of the content. The deep web contains information that cannot be indexed and found by a typical search engine. For example, deep web information may be contained in websites (e.g. government databases and libraries, etc.) and searched directly in the website rather than through a common search engine. Other examples of deep webpages include pages that are not linked by other pages searchable by a standard search engine, archived versions of webpages, dynamic pages that are returned by a server in response to a specific query, textual content encoded in multimedia files, etc. Standard browsers, however, can generally be used to access deep web content that is not part of the dark web.

The dark web is a subset of objects (e.g., pages of HTML and non-traditional content) of the deep web and is accessible over anonymous network 130. In the dark web, the information (or content) is intentionally hidden and is inaccessible through standard web browsers. Special software is used to access the dark web including, but not limited to 'The Onion Router' or 'Tor,' and Invisible Internet Project (I2P) services. I2P is an anonymous peer-to-peer distributed communication layer designed to allow applications to send messages to each other pseudonymously and securely. Tor is software that can be installed into a browser to enable special connections to dark websites that offer hidden services and resources. These hidden services and resources may be provisioned in non-standard top-level domains such as .onion, for example. Thus, once a dark top-level domain is identified, at least some dark websites can be identified based on their corresponding uniform resource locator (URL). When the Tor browser is invoked, a connection may be made to a Tor router (or onion router) that encrypts the network address (e.g., Internet Protocol (IP) address) of the connecting device. The communication also gets propagated through numerous randomly selected routers, potentially around the globe. Tor's encryption and routing techniques prevent the communication from being traced back to its source. Thus, user identities and host identities can remain anonymous. This ability to maintain anonymity in browsing and serving activities essentially invites illegal activity to flourish within the Tor network.

Computing environment 100 can include one or more client devices (e.g., 102, 104, 106, etc.) that can be used to allow users to interface with and consume resources of application servers, such as application server 190, which can enable secure transactions via transaction system 160. For instance, users can utilize client devices (e.g., 102, 104, 106, etc.) to access a transaction service (e.g., payment services of a financial institution) via application server 190 based on input from the user. In other instances, client devices (e.g., 102, 104, 106, etc.) may access transaction system 160 directly to request a transaction service (e.g., payment services, funds transfer service, etc.). Access to transaction services and resources may be provided with appropriate security mechanisms (e.g., authentication, risk analysis, etc.) based on particular needs and implementations.

Application server 190 may be integrated with, or may remotely interface with, transaction system 160 to enable users that access a service provided by application server 190 to request and complete transactions with transaction system 160 through the application server's service. Transaction system 160 may further be integrated with, or remotely interface with, risk authentication system 180, analytics system 170 and/or database server 150. Risk authentication system 180 can provide appropriate authentication mechanisms for transactions initiated via application server 190 by, for example, a user of a client device (e.g., 102, 104, 106). Risk authentication system 180 can also provide appropriate authentication mechanisms for transactions initiated directly through transaction system 160 (e.g., to enable a user to request financial transactions directly through the financial institution). Appropriate authentication includes requesting and verifying the right credential for the right level of security based on the particular transaction being requested. This may be dependent, for example, on the type of transaction being requested, the type of application through which the transaction was requested, the user making the request, the amount of the request, etc. Furthermore, analytics system 170 and authentication system 180 can provide risk analysis of risk factors, risk assessment of the particular transaction requested (e.g., risk of fraud), and feedback to transaction system 160 to appropriately adjust, if needed, authentication protocols for certain identified transactions.

Generally, computing environment 100 can include any type or topology of networks. Within the context of the disclosure, networks such as network 110 and anonymous network 130 represent a series of points or nodes of interconnected communication paths for receiving and transmitting packets of information that propagate through communication computing environment 100. These networks offer communicative interfaces between sources, destinations, and intermediate nodes, and may include any local area network (LAN), virtual local area network (VLAN), wide area network (WAN) such as the Internet, wireless local area network (WLAN), metropolitan area network (MAN), Intranet, Extranet, virtual private network (VPN), and/or any other appropriate architecture or system that facilitates communications in a network environment or any suitable combination thereof. Additionally, radio signal communications over a cellular network may also be provided in computing environment 100. Suitable interfaces and infrastructure may be provided to enable communication with the cellular network.

Communications in computing environment 100 may be inclusive of packets, messages, requests, responses, replies, queries, etc. Communications may be sent and received according to any suitable communication messaging protocols, including protocols that allow for the transmission and/or reception of packets in a network. Suitable communication messaging protocols can include a multi-layered scheme such as Open Systems Interconnection (OSI) model, or any derivations or variants thereof (e.g., transmission control protocol/IP (TCP/IP), user datagram protocol/IP (UDP/IP), etc.). Particular messaging protocols may be implemented in computing environment 100 where appropriate and based on particular needs. Additionally, the term 'information' as used herein, refers to any type of binary, numeric, voice, video, textual, multimedia, rich text file format, HTML, portable document format (pdf), or script data, or any type of source or object code, or any other suitable information or data in any appropriate format that may be communicated from one point to another in electronic devices and/or networks.

In general, "servers," "computing devices," "network elements," "database servers," "client devices," and "systems," etc. (e.g., 102, 104, 106, 132, 134, 136, 140, 150, 160, 170, 180, 190, etc.) in example computing environment 100, can include electronic computing devices operable to receive, transmit, process, store, or manage data and information associated with computing environment 100. As used in this document, the term "computer," "processor," "processor device," or "processing element" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, computing devices, network elements, database servers, systems, client devices, system, etc. (e.g., 102, 104, 106, 132, 134, 136, 140, 150, 160, 170, 180, 190, etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, monitoring system 140, database server 150, transaction system 160, analytics system 170, risk authentication system 180, application server 190, and/ or other sub-systems of computing environment 100 can be at least partially (or wholly) cloud-implemented, web-based, or distributed to remotely host, serve, or otherwise manage data, software services and applications interfacing, coordinating with, dependent on, or used by other systems, services, and devices in computing environment 100. In some instances, a server, system, subsystem, and/or computing device can be implemented as some combination of devices that can be hosted on a common computing system, server, server pool, or cloud computing environment and share computing resources, including shared memory, processors, and interfaces.

In one implementation, monitoring system 140, database server 150, transaction system 160, analytics system 170, and risk authentication system 180 include software to achieve (or to foster) the authentication enhancement and dark web analytics features, as outlined herein in this specification. Note that in one example, each of these elements can have an internal structure (e.g., a processor, a memory element, etc.) to facilitate some of the operations described herein. In other embodiments, these authentication enhancement and dark web analytics features may be executed externally to these elements, or included in some other network element to achieve this intended functionality. Alternatively, monitoring system 140, database server 150, transaction system 160, analytics system 170, and risk authentication system 180 may include this software (or reciprocating software) that can coordinate with other network elements in order to achieve the operations, as outlined herein. In still other embodiments, one or several devices may include any suitable algorithms, hardware, software, firmware, components, modules, interfaces, or objects that facilitate the operations thereof.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein. In an example, monitoring system 140, database server 150, transaction system 160, analytics system 170, and risk authentication system 180 can cooperate to offer a system for enhancing authentication in transaction systems with dark web analytics, and may be combined and implemented in a single physical machine or may be implemented in multiple physical and/or virtual machines.

For purposes of illustrating certain example techniques of enhancing authentication with dark web analytics in computing environment 100, it is important to understand the communications that may be traversing the network environment. The following foundational information may be viewed as a basis from which the present disclosure may be properly explained.

The Internet is a global network infrastructure interconnecting a vast array of networks. Anonymous network 130 is a portion of the Internet in which special anonymizing software networks allow access to the dark web. The dark web is widely known for facilitating illicit and/or nefarious activities due to anonymity associated with special browsers (e.g., Tor) used to access services and resources. For example, the dark web has been used for activities that include, but are not limited to human trafficking, wildlife trafficking, illegal sales and distribution of weapons, money laundering and theft, as well as offering an environment where these activities can be secretly discussed, planned, and executed. In particular examples, the dark web has been used to sell stolen credit card details and to discuss possible hacking methods to bypass a financial institution's secure payment systems. Because the dark web offers anonymity to its community of users, users may be willing to communicate more freely regarding their intents, plans, desires, knowledge or any other information related to topics (e.g., hacking, stealing, etc.) that motivate the users to conceal their identities.

Hackers, also known as 'malicious users,' have a multitude of tools available to hack into computer systems of organizations, such as banks and other financial institutions. Millions of dollars have been lost through some financial systems due to security holes in associated payment systems. In a recent real-life scenario, hackers attacked a particular financial system and stole more than 2.5 million pounds from customer accounts. Although breaching the financial system itself may not necessarily have involved the use of the dark web, news outlets reported that, prior to the attack, information exchanges among the community of users in the dark web included content related to the targeted financial institution and its computer security weaknesses or flaws. That is, 'chatter' increased on the dark web that pertained to the hacking and/or targeted financial institution. Due to the nature of the dark web, however, accessing its services and resources is not commonly done by reputable financial institutions and other enterprises. Consequently, indications of a risk that may be observed in the dark web is not generally or readily available to financial institutions or other enterprises.

Recently, an open-source search engine has been developed to enable user-configurable searches of the deep web and the dark web. The search engine provides searching capabilities of content that is 'below the surface' In the deep and dark webs. For example, searches can be performed on content that is not indexed by a commercial search engine or that is located in sites trying to hide their identities. In addition, nontraditional content can also be searched, including, but not limited to dynamic content, multimedia content, rich text formats, pictures, and audio files. In order to search the deep web and its dark web subset, this open-source search engine uses traditional known web-scraping technologies, high performance computing, and machine learning to focus searches and identify relevant content.

In an example scenario of a user-configurable search of the deep and dark webs, a user can configure a domain discovery tool to invoke web searchers and/or crawlers for particular content (e.g., based on keyword terms provided by the user) that is relevant to a desired search. Relevant websites can then be extracted from the search results and used to seed a search model (i.e., provide a list of uniform resource locators to crawl). For example, results may include websites with the terms used to identify the websites and the context of the terms used in the identified websites. The results may be visually displayed for a user in a distance graph, for example, and the terms may be reviewed to identify the most relevant websites. The identified websites can be selected by a user and a search model can be trained to enable subsequent searches for the data. Once the search model is trained, a user can generate a crawl by specifying a search model to be used for the crawl. The crawl can be submitted and the web searched for a configurable amount of time. Information can be collected based on the search, indexed, and visualized through one or more dashboards.

The searching abilities of this open-source search engine are of significant interest to law enforcement agencies. This interest is largely due to the ability of the search engine to uncover human trafficking and other illegal operations. These applications typically involve human users reviewing the search results and data analysis to determine whether and how this illegal activity can be stopped.

Figure 2:
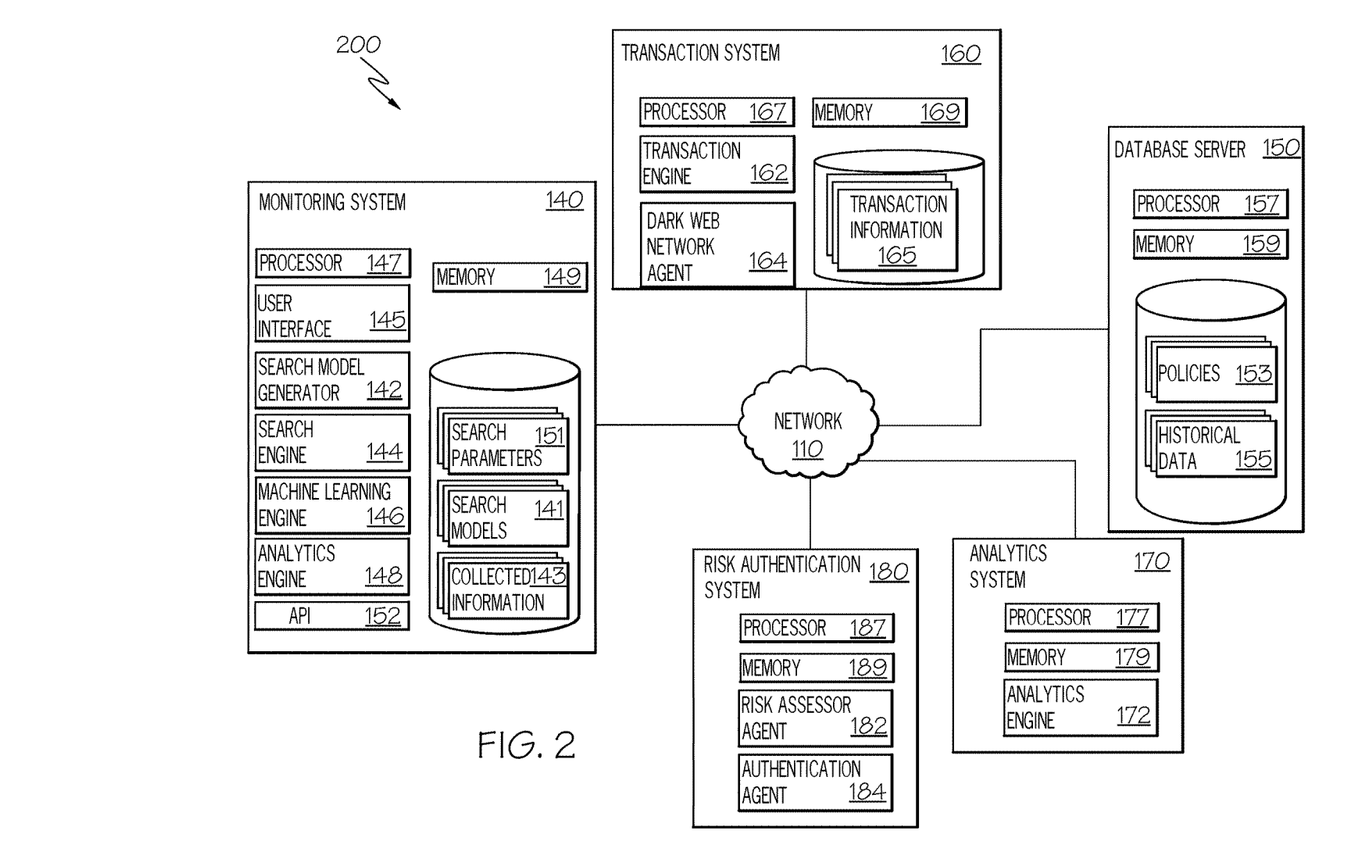
FIG. 2 is a simplified block diagram illustrating additional possible details of an example computing environment for enhancing authentication in a transaction system with dark web analytics according to at least one embodiment.

Embodiments described herein for enhancing authentication of transaction systems with dark web analytics, as outlined in FIGS. 1 and 2, can at least partially address some of the above-discussed issues, as well as others not explicitly described. For instance, monitoring system 140 can be configured to search the dark web for information indicating a potential risk to an entity that offers transaction services (e.g., payment transactions, funds transfer transactions, etc.) for authenticated users/devices. The search can be based on search parameters associated with the entity's brand (e.g., business name, trademark, etc.), organizational purposes (e.g., banking, brokerage firm, financial institution, etc.), and/or potential risks (e.g., hacking, theft/stealing money or funds, accounts, etc.). Analytics can be applied to the information collected by the monitoring system, and the resulting data (e.g., summarized data, trend data, threat level, etc.) can be fed to a transaction system (e.g., 160). Alternatively, the information collected, or some condensed or compressed version of the collected information, can be fed to the transaction system and at least some analytics can be performed after the data is received by the transaction system. The transaction system can coordinate with an analytics system (e.g., 170) for monitoring and evaluating the received data to identify potential risks to the entity. When analytics are applied, chatter (or volume of information) that is related to the entity may be evaluated based on one or more thresholds, and a threat level for potential attacks on the entity can be adjusted based on the evaluation. If a threat level is raised to a certain level, then additional authentication requirements can be implemented before the transaction is permitted to proceed. Once the threat level has been mitigated, then normal levels of security can be re-established.

Embodiments disclosed herein for enhancing authentication in transaction systems with dark web analytics provide several advantages. Embodiments herein offer automatic, real-time threat protection to transaction systems based on information derived from previously-hidden sources (e.g., dark web). In at least some scenarios, embodiments may also derive information from other non-indexed sources (e.g., deep web) and even some information from available, indexed sources (e.g., surface web). Transaction systems can be configured to protect its associated financial resources or accounts based on information generated by the attackers a priori of an attack (e.g., during the planning of an attack), rather than just the electronic data related to an attack after it has occurred or as it is occurring. Furthermore, by automatically adjusting the authentication requirements to a normal level once a threat has been mitigated, the customer experience is not significantly diminished. Additionally, over time, intelligence derived from the dark web (e.g., by monitoring system 140) on previous attacks can be used to help protect against future attacks.

Turning to FIG. 2, FIG. 2 is a simplified block diagram of a computing environment 200 illustrating some additional details that may be associated with components of a system for enhancing authentication of a transaction system with dark web analytics according to at least one embodiment.

Example environment 200 is shown illustrating possible details of monitoring system 140, database server 150, transaction system 160, analytics system 170, and risk authentication system 180, each of which may be implemented on separate physical or virtual machines such as servers. In other implementations, these elements may be combined in any suitable way in one or more physical or virtual machines. One or more of these elements may be provisioned in a local network or may be cloud-implemented or otherwise distributed to remotely provide authentication enhancement capabilities with dark web analytics for transaction system 160. For ease of illustration, FIG. 2 shows each of the elements (e.g., 140, 150, 160, 170, 180, 190) residing on separate physical or virtual machines.

Monitoring system 140 can include one or more processors 147 and one or more memory elements 149 for use in implementing executable modules such as a search model generator 142, a search engine 144, a machine learning engine 146, an analytics engine 148, and an application programming interface (API) 152, and for use in storing data such as search parameters 151, search models 141, and collected information 143. In at least one embodiment, a user interface 145 may be provided to enable user interaction with the monitoring system 140 to provide user-selected search parameters (e.g., keyword terms) and to generate a desired search model (e.g., 141) to be used in crawling the dark web and possibly the deep web to search for information such as, for example, chatter indicative of a potential risk for an entity associated with transaction system 160. In other embodiments, user interface 145 may be configured in a separate computing device that is communicatively coupled to monitoring system 140.

In an example scenario of a user-configurable search of the deep and dark webs, a user can configure a domain discovery tool to invoke web searchers and/or crawlers for content related to an entity (e.g., organization, enterprise, bank, brokerage firm, credit union, other financial institution, etc.) associated with transaction system 160. Search parameters 151 can be selected by a user via user interface 145 to be used as keyword terms in the web searchers and/or crawlers. For example, if the entity associated with the transaction system is a bank, then the bank name, nickname, and/or trademark can be included as a search parameter. In some scenarios, it may be useful to include the name of executives such as the chief executive officer. In addition, other terms related to the purpose of the bank could also be used as search parameters. Examples of such terms include, but are not limited to 'bank', 'banking,' 'financial', 'accounts,' etc. Additionally, terms related to hacking a bank may also be useful and could possibly include, but are not necessarily limited to 'hacking,' 'security hole,' 'encryption,' 'login,', 'password,' 'PIN,' and/or any other terms, or any combination of such terms that a hacker or malicious user might use when discussing or researching hacking into the bank's system.

Initially, a domain discovery search can be performed and the search results can include websites with hits on the search parameters or combinations of search parameters that are used. At least some websites may include non-indexed sites that are trying to remain hidden (e.g., websites in the dark web). By viewing how the search terms are used and the context of the terms in the returned websites, a user can identify and select the relevant non-indexed websites (e.g., traditional websites, chat rooms, forums, etc.) as a seed list of websites to be searched. The objects to be searched can include pages of non-traditional data such as dynamic content, multimedia files, audio content, pictures, rich text format files, etc. Search model generator 142 can generate a search model to be used for subsequent searches and crawling to more precisely target the desired data. Machine learning engine 146 can use the data selected by a user and returned from searches to further train and refine the search model. Once the search model is generated, a user can register a search to be performed based on the search model. The amount of search time may also be configurable in at least some implementations.

In other examples, monitoring system 140 may be pre-configured requiring more limited user input. For example, a domain discovery search may not be performed and instead, a seed list may be provided by a user, provided by a third party (e.g., computer security firm), or provided from a default seed list for the particular type of entity. In addition, in at least some scenarios, the seed list may be dynamically updated. Dynamically updated lists may be incorporated into an existing search model, for example. In some scenarios, the initial search model itself may be pre-configured for the particular entity and pre-registered for a search in monitoring system 140.

In at least some embodiments, the search can be a crawl in which objects (e.g., each page, traditional HTML content, non-traditional content, etc.) of the seeded websites is scanned based on the search parameters. Information can be collected based on the search and stored in collected information 143. In at least one embodiment, analytics could be performed by analytics engine 148 on the collected information. A web crawl of the dark web and/or deep web could potentially return massive amounts of data. Thus, it may be advantageous to perform at least some analytics on the collected information before forwarding any data to transaction system 160. For example, analytics engine 148 could summarize collected information 143 to indicate the volume of data received based on the various search criteria. The summarized data could include volume of data per search term, per combinations of search terms, per search, etc. Moreover, comparisons could be performed between the most recently collected information 143 and other sets of collected information (or summarized sets of collected information) that were previously collected. Trends based on the search terms could be identified. This may be particularly advantageous when the search includes dynamic data that changes often.

In at least some embodiments, analytics engine 148 can determine a threat level for the entity associated with transaction system 160 based on the summarized data. For example, a numerical scale (e.g., 0-5) could be used in at least one embodiment. In an example scale of 0-5, 0 could indicate that no threat has been detected based on a certain threshold, 5 could indicate that a threat has been detected and the associated entity is currently being attacked based on a certain threshold and/or based on particular content found during a search, 1-2 could indicate that certain thresholds have been met for collected information containing content related to hacking the particular type of entity at issue, and 3-4 could indicate that certain thresholds have been met for collected information containing content related to specific information about the particular entity at issue. The thresholds may be scaled respectively for each threat level in an embodiment. For example, a threshold for threat level 1 may be lower than a threshold for threat level 2, and a threat level 3 may be lower than a threshold for threat level 4. Moreover, thresholds may be indicative of a volume of particular content that was collected and/or thresholds may be indicative of a change in the volume of particular content that was collected compared to one or more collections of similar content in prior searches. One or both of these types of thresholds may be utilized during analytics.

Additionally, machine learning engine 146 can provide ongoing real-time adjustments to improve the searches based on real-time results from completed searches. For example, machine learning engine 146 can be configured to gain intelligence related to where to search (e.g., websites, domains, etc.), how to search (e.g., successful keyword terms or combinations of terms, length of searches, frequency of searches, etc.). This intelligence can be used to train and modify the search model and/or the invocation of the searches in at least some embodiments.

API 152 is an application programming interface designed to interact with both monitoring system 140 and transaction system 160. When a search has been completed, collected information 143 has been summarized, and a threat level has been determined, API 152 can communicate the threat level to transaction system 160. This can be a real-time feed that communicates the threat level as soon as it is determined, or very shortly thereafter. In some embodiments, API 152 may also provide the summarized data and/or trend data to transaction system 160. This data may be incorporated in analytics performed at the transaction system. For example, if a threat level is 2-3 and the trends indicate the chatter has increased in a particular country, then analytics may be performed by analytics system 170 (e.g., analytics engine 172) to determine whether a client device that has requested a transaction via transaction system 160 is located in the same country.

Also, included in environment 200 is transaction system 160, which can include one or more processors 167 and one or more memory elements 169 for use in implementing executable modules such as a transaction engine 162 and a dark web network agent 164, and for use in storing data such as transaction information 165. In one illustrative example, transaction system 160 may be associated with a financial entity and may be communicatively coupled to application servers (e.g., 190) that provide user interfaces to facilitate payment transactions via the financial entity for any number of items (e.g., services, goods, products, merchandise, food, bills, etc.). Transaction engine 162 can receive a payment request from a client device via an application server (e.g., 190), send a request for authentication credentials to the application server, receive credentials from the client device via the application server, perform verification of the credentials, and provide a response to the application server based on the results of the verification. Transaction system 160 can collect and store (e.g., in cache, database, etc.) transaction information related to the requested transaction. Examples of transaction information can include, but not necessarily limited to a user identifier, a device identifier, a location identifier, a date, a type of transaction, and an amount of the transaction. Based on the authentication process and/or additional risk analysis of the requested transaction, the transaction system could allow the payment transaction to proceed, request additional credentials, or block the payment transaction.

Transaction system 160 may also include dark web network agent 164 for processing data received from monitoring system 140. Dark web network agent 164 may be communicatively coupled to API 152 to receive a threat level, summarized data, and/or trend data after monitoring system has completed a search and performed analytics on the collected information. Dark web network agent 164 may provide the received data to analytics system 170. Additionally, in at least some embodiments, configuration of monitoring system 140 may occur at least partially through transaction system 160. For example, a user interface (not shown) of transaction system 160 could enable a user to, for example, select and/or modify search parameters to use and/or to select and/or modify websites to be crawled as previously discussed herein.

Analytics system 170, risk authentication system 180, and database server 150 can be communicatively coupled with transaction system 160, as separate components (e.g., servers), to provide analytics, risk assessment, and enhanced authentication, if needed, for transaction payments in real-time. In other implementations, one or more of analytics system 170, risk authentication system 180, and database server 150 may each be integrated with transaction system 160. Database server 150 can include one or more processors 157 and one or more memory elements 159 for use in receiving and storing data such as policies 153 and historical data 155. In some implementations, a database server, such as database server 150 may include multiple databases or other suitable storage structures to contain policies 153 and historical data 155. It should be apparent, however, that data stored in database server 150 could be virtually or physically divided into multiple machines, or integrated with one or more other components in computing environment 200.

Analytics system 170 can include one or more processors 177 and one or more memory elements 179 for use in implementing executable modules such as an analytics engine 172, and for communicating data to be stored in database server 150, such as historical data 155. In at least one embodiment, historical data can include summarized data, trend data, threat levels, and/or any other data or information related to search results from monitoring system 140. In some embodiments, threat levels, summarized data, trend data, and/or any other data or information related to search results from monitoring system 140, may be determined and/or generated by monitoring system 140, communicated to transaction system 160 via API 152, and added to historical data 155 in database server 150. In this implementation, transaction system 160 or analytics system 170 could potentially communicate the received data to database server 150. In other embodiments, however, some or all of the analysis, determination, and/or generation of analyzed data (e.g., threat levels, summarized data, trend data, etc.) can be performed by analytics system 170 and added to historical data 155 in database server 150. Accordingly, in some scenarios, collected information 143, or some condensed or compressed version of the collected information, can be fed to transaction system 160 and communicated to analytics system 170 such that analytics can be performed on the collected information. Any or all of the possible analytics described herein (e.g., with reference to analytics engine 148 of monitoring system 140) could be performed by analytics engine 172, and the results could be communicated to database server 150 to be added to historical data 155, for example.

In at least one embodiment, analytics engine 172 can generate a risk model based, at least in part, on a threat level received (or generated) based on search results from monitoring system 140. The risk model can indicate a current threat level to be considered for each payment transaction that is requested. In at least some implementations, the risk model could include other risk factors separate from the threat level that is related to searches by monitoring system 140. These other risk factors could be incorporated in the risk model as additional or alternative risk factors to be considered along with the threat level from the dark/deep web when determining a risk associated with a real-time transaction. The following policies provide an illustrative, non-limiting example of possible threat levels that may be received from monitoring system 140 (or generated by analytics system 170) for an entity, such as a bank:

Threat Level 0—No threat

Threat Level 1—Collected information includes information on hacking/breaching computer security of the bank based on a first threshold Threat Level 2—Collected information includes a higher amount of information on hacking/breaching computer security of the bank based on a second threshold Threat Level 3—Collected information includes specific information about the bank based on a third threshold Threat Level 4—Collected information includes a higher amount of specific information about the bank based on a fourth threshold Threat Level 5—Attack currently happening on the bank computer systems Risk authentication system 180 can include one or more processors 187 and one or more memory elements 189 for use in implementing executable modules such as a risk assessor agent 182 and an authentication agent 184. Generally, risk assessor agent 182 can receive transaction information (e.g., user identifier, device identifier, location identifier, date, type of transaction, amount of transaction, etc.) related to a requested transaction. For a financial institution, examples of transactions can include, but are not necessarily limited to payment transactions, funds transfer transactions, withdrawal transactions, security trading transactions, wire transfer transactions, etc. Risk assessor 182 can also assess the transaction risk of the requested transaction in real-time. In at least one embodiment, the transaction risk (e.g., risk of fraud, theft, etc.) may be assessed based, at least in part, on the risk model. In at least some scenarios, other factors may also affect the determination of the transaction risk including, for example, historical data 155 (e.g., current and prior threat levels, summarized data, trend data, etc.), user behavior, device characteristics, and/or previous transactions.

For illustration purposes, assume a transaction risk can be assessed as 'low,' 'medium,' or 'high.' In one example, the transaction risk can be determined to be low based, at least in part, on the threat level being 0 and other risk factors included in the risk model, if any, also being low. The transaction risk can be determined to be 'medium' based, at least in part, on the threat level being in the range of 1-4 and other risk factors, if any, not overriding the threat level. The transaction risk can be determined to be 'high' if the threat level is 5, regardless of whether other risk factors are present.

The transaction risk could also be determined to be 'high' in other scenarios where the threat level is in the range of 1-4. For example, if the transaction is between 1-4 and one or more other risk factors have a comparable risk assessment, then based on a threshold, the combination of the threat level and the one or more other risk factors could elevate the transaction risk to 'high.' In another scenario, if the threat level is in the range of 1-4 and the trend data indicates an increased volume of hits in a particular location (e.g., continent, country, state, province, city, etc.) based on the last monitoring system search, then if the requested payment transaction is associated with a location identifier corresponding to the particular location indicated by the trend data, the transaction risk may be elevated to 'high.' In yet another scenario, other information may also be evaluated when determining the transaction risk. For example, user behavior, device characteristics, historical data, and previous transactions may also affect the determination of the transaction risk.

Once a transaction risk has been assessed, authentication agent 184 can determine an appropriate response to the level of risk based on a policy (e.g., 153). For example, if the transaction risk is 'low,' then the requested transaction may be allowed. If the transaction risk is 'high,' then the requested transaction may be blocked. If the transaction risk is 'medium,' then one or more enhanced security protocols may be used to mitigate the degree of risk. For example, multi-factor authentication may be required before a requested payment transaction is allowed. Multi-factor authentication can include requesting one or more additional credentials from the user, in order to verify the authenticity of the user and mitigate the risk of fraud. Additional credentials can include, but are not limited to, biometric credentials (e.g., fingerprint, voice, eye, hand movement, etc.), security questions, security code authenticated via another medium (e.g., sent through email, phone call, text message, etc.) and provided to transaction system 160 by the user, etc. If the user is authenticated based on the enhanced security protocol, then the requested payment transaction may proceed. If the user is not authenticated based on the enhanced security protocol, the requested payment transaction may be blocked.

Figure 3:
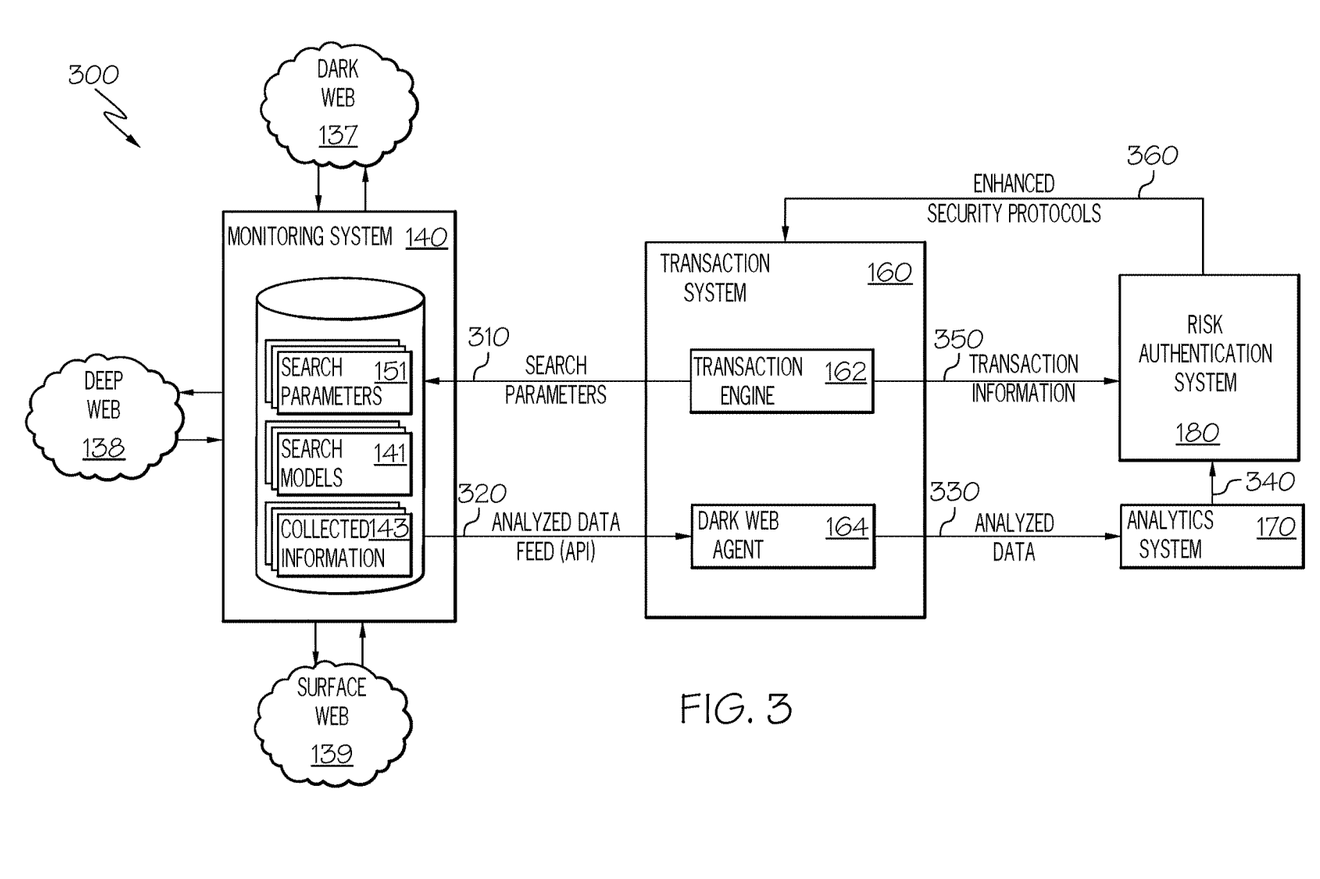
FIG. 3 is a simplified block diagram illustrating an example flow between possible components of an example computing environment for enhancing authentication in a transaction system with dark web analytics according to at least one embodiment.

Turning to FIG. 3, FIG. 3 is a simplified block diagram of a computing environment 300 illustrating some potential interactions between components of a system for enhancing authentication of a transaction system with dark web analytics according to at least one embodiment. In particular, monitoring system 140, transaction system 160, risk authentication system 180, analytics system 170, and various webs within the Internet, including a dark web 137, a deep web 138, and a surface web 139, are included in example environment 300. For purposes of illustration, interactions in computing environment 300 may at times be explained with reference to an example scenario in which these components may interact. Accordingly, for this illustration, it is assumed transaction system 160 is associated with a financial institution that holds individual checking and/or savings accounts for users, and that other entities (e.g., stores, service providers, government entities, etc.) have interfaces to the transaction system to enable users to request payment transactions that, if successful, are satisfied by funds from the users' respective accounts in the financial institution.

In this example, at 310, search parameters are communicated to monitoring system 140 from transaction system 160. Transaction system 160 may be provisioned with a user interface and suitable modules to enable a user to select search parameters related to the financial institution (e.g., name and/or nickname of the financial institution, trademark of the financial institution, terms related to hacking, stealing, accounts, computer security weaknesses, etc.). Monitoring system 140 can store search parameters 151 and use the search parameters to initiate a domain discovery search in the deep web 138 and/or dark web 137. The returned results can include websites that are not indexed by traditional Internet search engines (e.g., websites in the deep web that are not in the dark web), and some other non-indexed websites that are intentionally trying to remain hidden (e.g. websites in the dark web).

In some embodiments, a user may view the search results to evaluate the usage context of the search parameters in the identified websites. The user may select the most relevant websites to create a search model to be used to crawl the dark web and possibly the deep web. In some instances, only websites that are part of the dark web may be selected. Examples of dark websites could include, for example, Brash, Alpha Bay (i.e., dark website used for illegal trading), and/or a hacking forum. In other instances, websites in both the deep web and the dark web may be selected. For example, if bitcoin activity is found in a website in the deep web, and if the website has relevance to other websites found in the domain discovery search that are in the dark web and are related to the financial institution, then the deep website may be determined as relevant and selected for the search model.

Once a search model (e.g., 141) is created, search engine 144 can crawl the dark web 137 and possibly the deep web 138 based on the search model for a preselected amount of time. In particular, websites in the search model may be crawled, where objects (e.g., pages of HTML and/or non-traditional data) are searched based on the search parameters. The search returns collected information 143, which can be stored and potentially analyzed by monitoring system 140. For example, monitoring system may perform analytics to generate summarized data, trend data, and/or a threat level based on the collected information.

In some embodiments, search engine 144 (or a separate search engine configured for traditional surface web searches) may also be configured to handle searches of the surface web 139. Searches of surface web 139 may be incidental to searches of the dark and/or deep webs, and may be used to supplement the dark and/or deep web searches. For example, like the dark and deep webs, bitcoin activity may also be detected in the surface web. Potentially relevant bitcoin activity may exit the dark web 137 and the deep web 138, and appear in the surface web 139. Thus, searches could be performed based on websites related to the relevant bitcoin activity in the surface web. The results of these searches could be combined with the results of searches in the dark and/or deep web. In another example, chat rooms on the surface web that offer technical help (e.g., stack overflow) may be useful to actors on the dark web. These actors may surface in these surface web chat rooms to ask for help with the TOR browser, for example.

At 320, API 152 facilitates an information feed of the analyzed data (e.g., summarized data, trend data, threat level) to transaction system 160. In particular, at 330, dark web agent 164 can communicate the analyzed data to analytics system 170. In at least one embodiment, this may be a real-time feed (or substantially real-time) where the analyzed data generated from search results is communicated to transaction system 160 at the time (or close to the time) it is generated.

In other embodiments, some analytics may be performed by analytics system 170. In this alternative embodiment, collected information 143 (or some condensed or compressed version of collected information 143) may be fed to transaction system 160 at 320 by API 152. The collected information 143 (or the condensed or compressed version of the collected information) may be provided to analytics system 170 by dark web agent 164. Analytics system 170 can perform analytics to generate one or more of summarized data, trend data, and a threat level determined based on the collected information. Once the analytics system has received or generated the threat level, it may generate a risk model based on the threat level and possibly other known risk factors. The summarized data, trend data, and/or threat level can be stored (e.g., historical data 155).

At 340, analytics system 170 can communicate the risk model to risk authentication system 180. Risk authentication system 180 can also receive at 350, from transaction engine 162, transaction information (e.g., user identifier, device identifier, location identifier, date, type of transaction, amount of transaction, etc.) related to a real-time, requested payment transaction. Risk authentication system 180 can determine a transaction risk associated with the requested payment transaction. For example, the transaction risk may be based, at least in part, on the threat level indicated in the risk model. If the transaction risk is determined to be a particular risk based on a numerical (e.g., 0-5) or descriptive scale (e.g., low-medium-high), then policies may require one or more enhanced security protocols to be automatically implemented for the pending requested payment transaction. For example, if the transaction risk is determined to be medium on a low-medium-high scale, then a policy may require a multi-factor authentication protocol (e.g., biometric authentication, security questions, etc.) to be implemented. Accordingly, the required enhanced security protocol or protocols based on policy are identified and, at 360, the identified enhanced security protocol or protocols are communicated to transaction system 160 to enable further authentication interactions with the user. If the user successfully authenticates based on the enhanced security protocol or protocols, then the payment transaction may be allowed. If the user does not successfully authenticate based on the enhanced security protocol or protocols, then the payment transaction may be blocked.

The enhanced security protocol or protocols may be implemented in any suitable manner according to particular needs and implementations. For example, the enhance security protocol or protocols could be implemented as a one-time event and a transaction risk can be determined and evaluated for every subsequent requested transaction. In other implementations, the enhance security protocol or protocols could be implemented based on a predetermined period. The predetermined period could be an arbitrary or intentional period of time. In another implementation, the predetermined period could be the period until the threat is mitigated according to predefined criteria (e.g., based on threat levels, risk factors, transaction information, etc.). In yet another implementation, the predetermined period could the period until a signal is received from an administrator.

Figure 4:
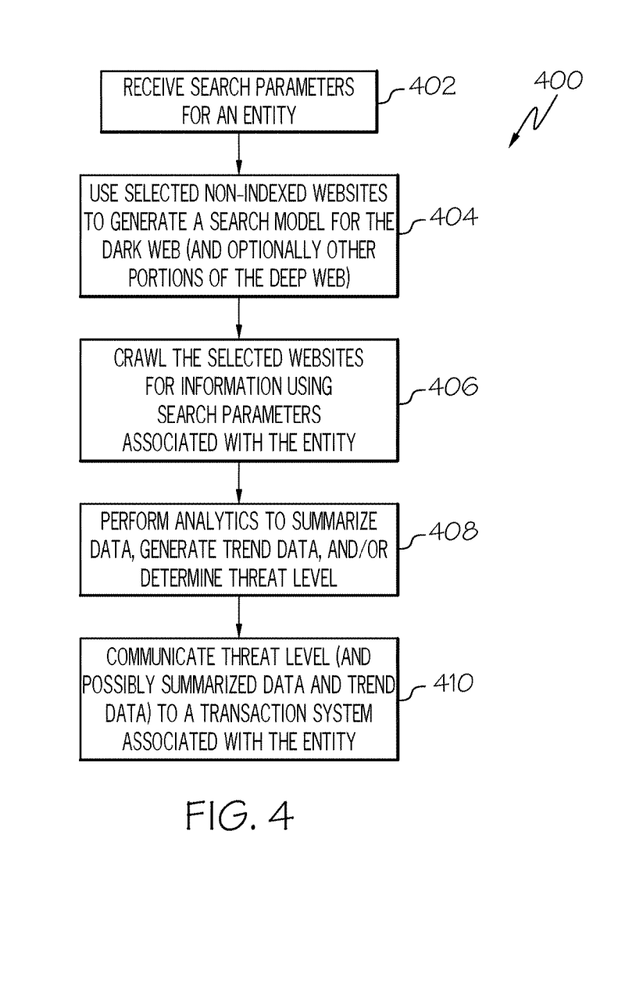
FIGS. 4-6 are simplified flowcharts illustrating example techniques associated with enhancing authentication in a transaction system with dark web analytics according to at least one embodiment.

Turning to FIG. 4, a simplified flowchart 400 is presented illustrating example techniques associated with a system for enhancing authentication of a transaction system with dark web analytics. In at least one embodiment, one or more sets of operations correspond to activities of FIG. 4. A monitoring system (e.g., 140), or a portion thereof, may utilize the one or more sets of operations. Monitoring system 140 may comprise means such as processor 147 for performing the operations. In an embodiment, search model generator 142, search engine 144, analytics engine 148, machine learning engine 146, and/or API 152 may each perform at least some operations of flow 400.

At 402, the monitoring system receives one or more search parameters for an entity associated with a transaction system (e.g., 160) communicatively coupled to or integrated with the monitoring system. The entity could be any organization that enables users to request transactions (e.g., payments, funds transfers, security trades, etc.) via a transaction system. Examples of search parameters include, but are not limited to brand information such as name, nickname or trademark of entity, other keyword terms related to hacking, computer security, bank accounts, attacks, etc.).

At 404, selected non-indexed websites can be used to generate a search model. The selected non-indexed websites may include one or more websites that have been intentionally hidden (e.g., on the dark web). Optionally, other selected non-indexed websites may also be used in the search model for other portions of the deep web. In one example, the websites may be selected by a user from the results of an initial domain discovery search. In another example, a seed list of the non-indexed websites may be entered by a user (e.g., an administrator) via a user interface. In yet another example, a seed list of the non-indexed websites may be provided by a third party or by a default seed list. In yet a further example, the non-indexed websites may be identified based on machine learning from searches previously conducted by monitoring system 140.

Once the search model is generated, a search may be registered, scheduled, initiated, started, etc. Accordingly, at 406, the dark web and possibly the deep web may be crawled based on the search model. More specifically, the selected websites may be crawled, searching objects (e.g., pages of HTML and/or non-traditional data) based on search parameters associated with the entity. At 408, analytics may be performed on collected information from the search. For example, the collected information may be summarized, trend data may be generated, and/or a threat level may be determined. At 410, the threat level, and possibly the summarized data and/or the trend data may be communicated via an API to the transaction system (e.g., 160) associated with the entity.

Figure 5:
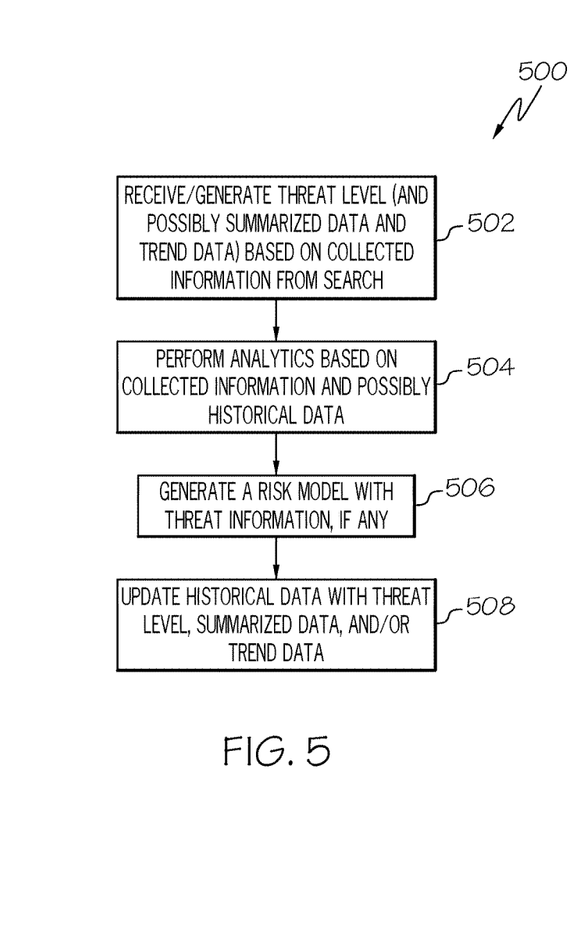

Turning to FIG. 5, a simplified flowchart 500 is presented illustrating example techniques associated with a system for enhancing authentication of a transaction system with dark web analytics. In at least one embodiment, one or more sets of operations correspond to activities of FIG. 5. An analytics system (e.g., 170), or a portion thereof, may utilize the one or more sets of operations. Analytics system 170 may comprise means such as processor 177 for performing the operations. In an embodiment, analytics engine 172 may perform at least some operations of flow 500. In this example flow 500, a search of the dark web and possibly the deep web has already been performed by monitoring system 140.

At 502, a threat level and possibly summarized data and/or trend data can be received from the monitoring system, or generated by analytics engine 172 depending on the implementation. The threat level, summarized data, and/or trend data can be generated based on collected information resulting from the search. At 504, if the threat level was not generated by monitoring system 140, then analytics may be performed on collected information from the search (or a condensed or compressed version of the collected information, such as summarized data) to generate the threat level and possibly trend data. Historical data generated based on one or more prior searches may also be used to generate trend data. At 506, a risk model can be generated with the threat level and possibly other known risk factors. At 508, historical data can be updated with the summarized data, trend data, and/or threat level.

Figure 6:
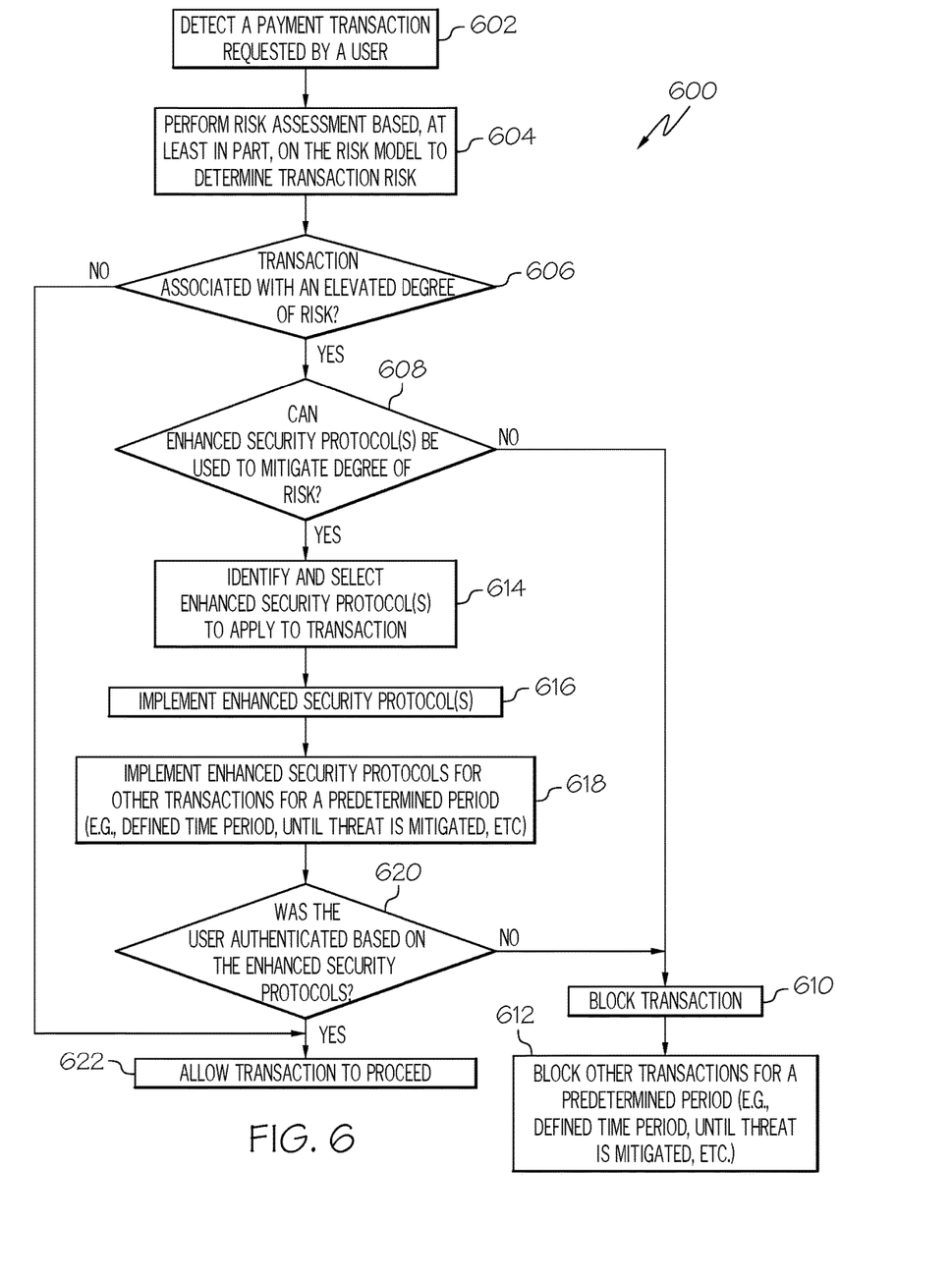

Turning to FIG. 6, a simplified flowchart 600 is presented illustrating example techniques associated with a system for enhancing authentication of a transaction system with dark web analytics. In at least one embodiment, one or more sets of operations correspond to activities of FIG. 6. Risk authentication system 180, or a portion thereof, may utilize the one or more sets of operations. Risk authentication system 180 may comprise means such as processor 187 for performing the operations. In an embodiment, risk assessor agent 182 and authentication agent 184 may each perform at least some operations of flow 600. In this example flow 600, a risk model has been created by analytics system 170, a user has successfully accessed the transaction system 160 (e.g., by providing appropriate credentials such as a user ID and password), and a payment transaction has been requested to be fulfilled from the user's account.

At 602, a payment transaction initiated by a user is detected. For example, the payment transaction may be detected by receiving transaction information from transaction system 160. At 604, a risk assessment may be performed based, at least in part, on a risk model to determine a transaction risk associated with the requested payment transaction. At 606, a determination can be made as to whether the transaction risk indicates an elevated degree of risk. In at least one embodiment, this determination can be made based on policy by identifying a policy applicable to the transaction risk. For example, if the transaction risk is determined on a scale of 'low,' 'medium,' or 'high', then policies can be identified that correspond to the appropriate transaction risk of 'low,' 'medium,' or 'high.' It should also be apparent that this scale is provided for illustration purposes. Any other suitable scaling could be used to rate the risk of a transaction. For example, a numerical scale (e.g., 0-5) could be used and/or additional granularity could be provided in the scale (e.g., 'medium-low,' 'medium-high,' etc.).

If the transaction is not associated with an elevated degree of risk (e.g., transaction risk is 'low'), then at 622, the transaction may be allowed to proceed. Alternatively, if the transaction is associated with an elevated degree of risk, then at 608, a determination may be made as to whether one or more enhanced security protocols could be used to mitigate the degree of risk. For example, if the transaction risk indicates an attack is currently happening (e.g., transaction risk is 'high'), then enhanced security protocols cannot mitigate the degree of risk. In this scenario, therefore, the transaction may be blocked at 610.

At 612, subsequent payment transactions may be blocked for a predetermined period. This predetermined period could be determined based on particular needs and implementations. For example, the predetermined period could be a defined amount of time or could be based on the occurrence of the threat being mitigated based on a new threat level and/or other new risk factors. In another implementation, the predetermined period could be the period until a signal is received from a user (e.g., an administrator). In order to effect blocking subsequent payment transactions based on a predetermined period, information indicating the blocking and/or the predetermined period may be provided to analytics system 170 to be stored in historical data and used in the creation of risk models to override transaction risks that may otherwise be determined to be 'low' if the chatter subsides in subsequent searches by monitoring system 140.

At 608, if it is determined that one or more enhanced security protocols could be used to mitigate the degree of risk for a payment transaction (e.g., transaction risk is 'medium'), then at 614, one or more appropriate enhanced security protocols can be identified and selected. In one example, one or more multi-factor credentials may be selected. If the transaction risk is rated on a scale with more granularity, then the enhanced security protocols can be selected based on the particular transaction risk. For example, a policy may indicate that when a risk for the transaction is rated 'medium-low,' then the enhanced security protocol may include only one additional security question. If the risk for the transaction is rated 'medium-high,' however, then the enhanced security protocol may include a biometric credential and a security question.

At 616, the one or more selected security protocols can be implemented. At 618, the one or more selected enhanced security protocols may be implemented for subsequent payment transactions for a predetermined period. A predetermined period could be determined based on particular needs and implementations. For example, the predetermined period could be a defined amount of time or could be based on the occurrence of the threat being mitigated based on a new threat level and/or other new risk factors. In another implementation, the predetermined period could be the period until a signal is received from a user (e.g., an administrator). In order to effect the implementation of the one or more selected enhanced security protocols for subsequent payment transactions, information indicating the enhanced security protocols and/or the predetermined period may be provided to analytics system 170 to be stored in historical data and used in the creation of risk models to override transaction risks that may otherwise be determined to be 'low' if the chatter subsides in subsequent searches by monitoring system 140.

At 620, a determination can be made as to whether the user was authenticated based on the one or more enhanced security protocols for the current payment transaction. If the user was not authenticated, then at 610, the transaction may be blocked. Subsequent transactions may also be blocked (or the selected enhanced security protocols may be implemented) for a predetermined period as previously described herein. If the user was authenticated based on the one or more enhanced security protocols, as determined at 620, then at 622, the payment transaction may be allowed to proceed.

The flowcharts and block diagrams in the Figures illustrate the architecture, functionality, and operation of possible implementations of systems, methods, apparatuses, and computer program products according to various aspects of the present disclosure. In this regard, each block or interaction in the flowchart, interaction, or block diagrams may represent a module, segment, logic, or portion of code, which comprises one or more executable instructions for implementing the specified logical function(s). It should also be noted that, in some alternative implementations, the functions noted in the block or interaction may occur out of the order noted in the figures. For example, two blocks or interactions shown in succession may, in fact, be executed substantially concurrently, or the blocks or interactions may sometimes be executed in the reverse order, depending upon the functionality involved. It should also be noted that each block or interaction of the block diagrams and/or flowchart illustrations, or combinations of blocks or interactions in the block diagrams and/or flowchart illustration, can be implemented by special purpose hardware-based systems that perform the specified functions or acts, or combinations of special purpose hardware and computer instructions.

As used herein, unless expressly stated to the contrary, use of the phrase 'at least one of' refers to any combination of the named elements, conditions, or activities. For example, 'at least one of X, Y, and Z' is intended to mean any of the following: 1) at least one X, but not Y and not Z; 2) at least one Y, but not X and not Z; 3) at least one Z, but not X and not Y; 4) at least one X and at least one Y, but not Z; 5) at least one X and at least one Z, but not Y; 6) at least one Y and at least one Z, but not X; or 7) at least one X, at least one Y, and at least one Z. Also, references in the specification to "one embodiment," "an embodiment," "some embodiments," etc., indicate that the embodiment(s) described may include a particular feature, structure, or characteristic, but every embodiment may or may not necessarily include that particular feature, structure, or characteristic. Moreover, such phrases are not necessarily referring to the same embodiment. Additionally, unless expressly stated to the contrary, the terms 'first', 'second', 'third', etc., are intended to distinguish the particular nouns (e.g., element, condition, module, activity, operation, claim element, etc.) they modify, but are not intended to indicate any type of order, rank, importance, temporal sequence, or hierarchy of the modified noun. For example, 'first X' and 'second X' are intended to designate two separate X elements, that are not necessarily limited by any order, rank, importance, temporal sequence, or hierarchy of the two elements.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
   searching objects in a website of a dark web for information related to an entity and generated by a potential attacker of one or more systems associated with the entity, the one or more systems providing transaction services to users, wherein the dark web is accessible over an anonymous network;
   determining a threat level of the entity based, at least in part, on the information;
   detecting a transaction initiated in a system associated with the entity;
   determining the transaction is associated with an elevated degree of risk based, at least in part, on the threat level of the entity; and
   modifying an authentication requirement for the transaction based, at least in part, on the elevated degree of risk.

2. The method of claim 1, wherein modifying the authentication requirement comprises implementing an enhanced security protocol to authenticate a user requesting the transaction.

3. The method of claim 2, wherein the enhanced security protocol comprises a multi-factor authentication of the user.

4. The method of claim 2, wherein the enhanced security protocol is identified based, in part, on a transaction risk.

5. The method of claim 1, further comprising:
   summarizing the information to create summarized data; and
   communicating the summarized data to the system using an application programming interface (API).

6. The method of claim 1, wherein the objects comprise at least one of dynamic content, multimedia content, audio content, and a picture.

7. The method of claim 1, wherein the information is related to at least one of a hacker forum, a dark web uniform resource locator (URL), and a brand associated with the entity.

8. The method of claim 1, wherein the objects are searched using configurable search parameters.

9. The method of claim 8, wherein the search parameters comprise a name associated with the entity.

10. The method of claim 1, wherein the anonymous network comprises a Tor server.

11. The method of claim 1, wherein the threat is identified based, at least in part, on comparing a portion of the information to a threshold.

12. The method of claim 1, further comprising:
    generating a risk model comprising the threat level.

13. The method of claim 12, wherein the determining the transaction is associated with an elevated degree of risk comprises evaluating the risk model and at least one of a user behavior, device characteristics, historical data, and previous transactions, wherein the user behavior corresponds to a user associated with the transaction, and wherein the device characteristics correspond to a device used to initiate the transaction.

14. The method of claim 1, further comprising:
    searching second objects in a deep web for second information, wherein the second objects are searched based, at least in part, on the information from the dark web.

15. The method of claim 14, further comprising:
    searching third objects in a surface web for third information, wherein the third objects are searched based, at least in part, on one of the information from the dark web and the second information from the deep web.

16. A non-transitory computer readable storage medium comprising computer readable program code that is executable by a computer system to:
    receive information related to an entity and generated by a potential attacker of one or more systems associated with the entity, the one or more systems to provide transaction services to users, wherein the information is to be obtained from searching objects in a website of a dark web accessible over an anonymous network;
    determine a threat level of the entity based, at least in part, on the information;
    detect a transaction initiated in a system associated with the entity;
    determine a transaction is associated with an elevated degree of risk based, at least in part, on the threat level of the entity; and
    modify an authentication requirement for the transaction based, at least in part, on the elevated degree of risk.

17. The non-transitory computer readable storage medium of claim 16, wherein the information is related to at least one of a hacker forum, a dark web uniform resource locator (URL), and a brand associated with the entity.

18. A system comprising:
    a memory storing a first set of instructions; and
    a data processor coupled to the memory and configured to execute the first set of instructions to:
        perform a search of objects in a website of a dark web for information related to an entity and generated by a potential attacker of one or more systems associated with the entity, the one or more systems to provide transaction services to users, wherein the dark web is accessible over an anonymous network; and
    a transaction system configured to execute a second set of instructions to:
        detect a transaction initiated in a system associated with the entity;
        determine the transaction is associated with an elevated degree of risk based, at least in part, on a threat level of the entity, wherein the threat level of the entity is determined based, at least in part, on collected information returned by the search; and
        modify an authentication requirement for the transaction based, at least in part, on the elevated degree of risk.

19. The system of claim 18, wherein the objects are searched using one or more configurable search parameters, wherein one of the one or more search parameters comprise a name associated with the entity.

20. The system of claim 18, wherein the data processor is configured to execute the first set of instructions further to:
   search second objects in a deep web for second information, wherein the second objects are searched based, at least in part, on the collected information from the dark web.

* * * * *